(12) United States Patent
Chang Chien

(10) Patent No.: US 10,824,246 B2
(45) Date of Patent: Nov. 3, 2020

(54) METHOD OF CONTROLLING AN ELECTRONIC DEVICE VIA TAPPING AND TAPPING CONTROLLING SET

(71) Applicant: CHICONY ELECTRONICS CO., LTD., New Taipei (TW)

(72) Inventor: Lao-Hsiu Chang Chien, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 0 days.

(21) Appl. No.: 16/511,460

(22) Filed: Jul. 15, 2019

(65) Prior Publication Data

US 2020/0192492 A1   Jun. 18, 2020

(30) Foreign Application Priority Data

Dec. 14, 2018 (TW) ............................. 107145309 A

(51) Int. Cl.
*G06F 3/0346* (2013.01)
*G06F 3/038* (2013.01)

(52) U.S. Cl.
CPC .......... *G06F 3/0346* (2013.01); *G06F 3/0383* (2013.01)

(58) Field of Classification Search
CPC ............... G06F 3/0346; G06F 3/017; G06F 2200/1636; A63F 13/211; A63F 13/428
USPC ............................................ 345/158; 463/36
See application file for complete search history.

(56) References Cited

U.S. PATENT DOCUMENTS

| | | | | |
|---|---|---|---|---|
| 5,703,623 A | * | 12/1997 | Hall | G06F 3/0346 345/156 |
| 8,717,291 B2 | * | 5/2014 | Sun | G06F 21/83 345/158 |
| 8,884,877 B2 | * | 11/2014 | Caritu | G06F 3/0346 345/158 |
| 2014/0168057 A1 | * | 6/2014 | Ahuja | G06F 3/0346 345/156 |
| 2014/0370937 A1 | | 12/2014 | Park et al. | |
| 2015/0061842 A1 | | 3/2015 | Yoon et al. | |

* cited by examiner

*Primary Examiner* — Koosha Sharifi-Tafreshi
(74) *Attorney, Agent, or Firm* — Muncy, Geissler, Olds & Lowe, P.C.

(57) ABSTRACT

A method of controlling an electronic device via tapping is applied to a tapping controlling set to control an electronic device. The tapping controlling set includes a tapping device, and the tapping device includes an action sensor, a controller and a transmission unit. The action sensor includes an acceleration sensor and a gyro sensor. The controller is electrically connected to the action sensor and the transmission unit, and the transmission unit is electrically connected to the electronic device. The method of controlling an electronic device via tapping includes the steps of: via the acceleration sensor and the gyro sensor, sensing an acceleration change and an angular velocity change of the tapping device to generate a movement signal; according to the movement signal, generating a controlling signal via the controller; via the transmission unit, sending the controlling signal to the electronic device.

17 Claims, 8 Drawing Sheets

METHOD OF CONTROLLING AN ELECTRONIC DEVICE VIA TAPPING AND TAPPING CONTROLLING SET

BACKGROUND OF THE INVENTION

1. Field of the Invention

The present invention relates to a method of controlling an electronic device via tapping; more particularly, the present invention relates to a method of controlling an electronic device via tapping without using a pressure sensor on the electronic device.

2. Description of the Related Art

A modern electronic device such as a smartphone or a notebook computer usually has buttons or a pressure sensing plate for the user to apply a force to operate the electronic device. The buttons or the pressure sensing plate are located on the surface of the electronic device; thus, the electronic device must provide a suitable installation space for the buttons or the pressure sensing plate. If the number of buttons increases, the installation space will also increase. Moreover, the user must take time to observe and remember the instructions that should be input via the different buttons, press the correct buttons and enter correct instructions; in addition, the user must apply force on the specific position of a button or a pressure sensing plate to operate the electronic device, which is inconvenient for the user.

Therefore, there is a need to provide a new method for controlling an electronic device to solve the problem caused by pressing buttons or a pressure sensing plate to operate an electronic device.

SUMMARY OF THE INVENTION

It is an object of the present invention to provide a method of controlling an electronic device via tapping without using a button or a pressure sensor on an electronic device.

To achieve the abovementioned object, a method of controlling an electronic device via tapping of the present invention is applied to a tapping controlling set for controlling an electronic device. The tapping controlling set includes a tapping device. The tapping device includes an action sensor, a controller and a transmission unit. The action sensor includes an acceleration sensor and a gyro sensor. The controller is electrically connected to the action sensor and the transmission unit. The transmission unit is electrically connected to the electronic device. The method of controlling an electronic device via tapping includes: via the acceleration sensor and the gyro sensor, sensing an acceleration change and an angular velocity change of the tapping device to generate a movement signal; the movement signal includes a first movement information and a second movement information; the first movement information is generated by the tapping device being in a waving state, and the second movement information is generated by the tapping device being in a tapping state; according to the movement signal, generating a controlling signal via the controller; via the transmission unit, sending the controlling signal to the electronic device.

According to one embodiment of this invention, the first movement information and the second movement information both include a displacement direction signal, an acceleration signal and an angular velocity signal.

According to one embodiment of this invention, the movement signal further includes a third movement information, the third movement information is generated by the at least one tapping device changing from the tapping state to a moving state, and the third movement information includes a displacement direction signal, an acceleration signal and an angular velocity signal.

According to one embodiment of this invention, the step of according to the movement signal, generating the controlling signal via the controller further includes: when the controller detects that the at least one tapping device stops moving for a specific time according to the movement signal, generating the controlling signal.

According to one embodiment of this invention, the at least one tapping device further includes a storage, and the storage is electrically connected to the controller.

According to one embodiment of this invention, the method of controlling an electronic device via tapping further includes: storing the movement signal in the storage.

According to one embodiment of this invention, the method of controlling an electronic device via tapping further includes: filtering the movement signal.

According to one embodiment of this invention, the at least one tapping device further includes a main body, and the action sensor is located on one end of the main body.

It is another object of the present invention to provide a tapping controlling set for controlling an electronic device via tapping without using the pressure sensor of the electronic device.

To achieve the abovementioned object, a tapping controlling set of the present invention is used for controlling an electronic device via tapping. The tapping controlling set includes a tapping device. The tapping device includes an action sensor, a controller and a transmission unit. The action sensor includes a gyro sensor and an acceleration sensor. The gyro sensor is used for sensing an angular velocity change of the tapping device, and the acceleration sensor is used for sensing an acceleration change of the tapping device. The controller is electrically connected to the action sensor. The controller is used for generating a movement signal according to the acceleration change and the angular velocity change. The movement signal includes a first movement information and a second movement information. The first movement information is generated by the tapping device being in the waving state, and the second movement information is generated by the tapping device being in the tapping state. The controller is further used for generating a controlling signal according to the movement signal. The transmission unit is electrically connected to the controller and the electronic device. The transmission unit is used for sending the controlling signal to the electronic device.

DETAILED DESCRIPTION OF THE PREFERRED EMBODIMENT

Figure 1:
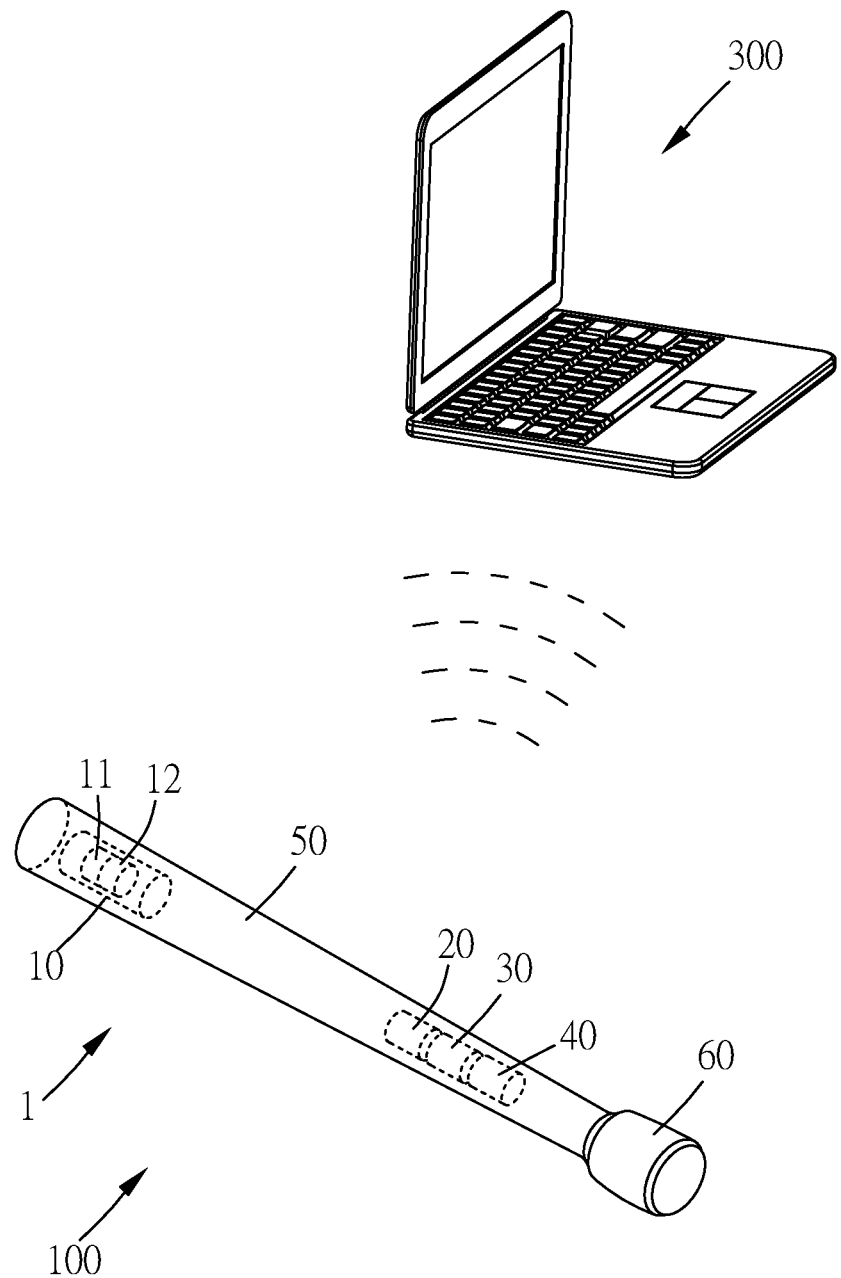
FIG. 1 illustrates a schematic drawing of the tapping controlling set and the electronic device in the first embodiment of the present invention.
Figure 2:
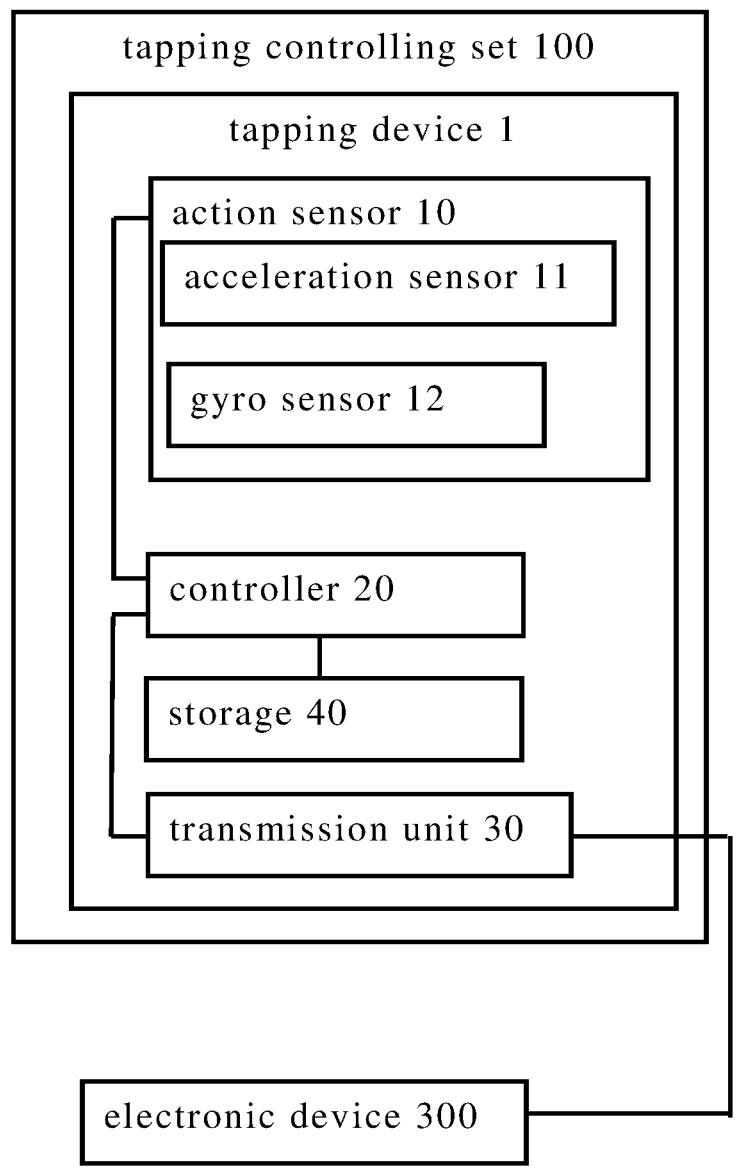
FIG. 2 illustrates a system structure drawing of the tapping controlling set and the electronic device in the first embodiment of the present invention.
Figure 3:
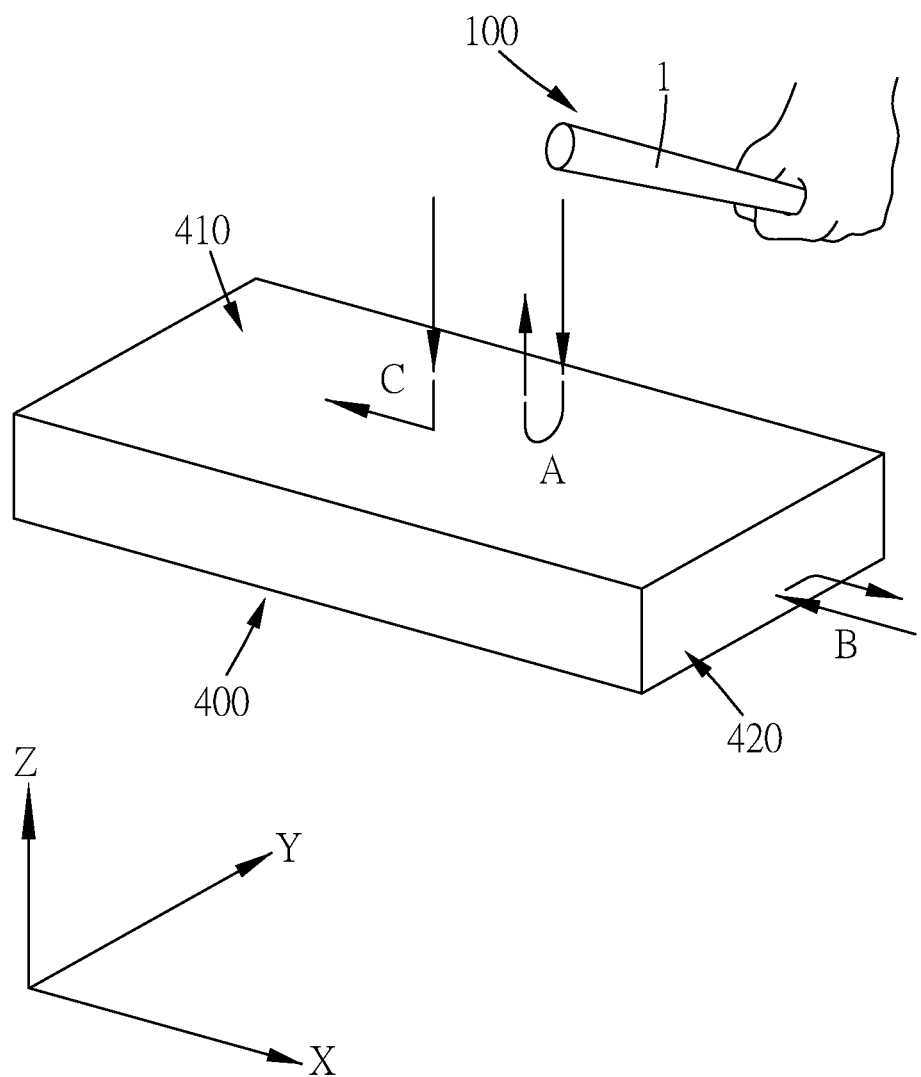
FIG. 3 illustrates a schematic drawing of the tapping controlling set tapping an external object in the first embodiment of the present invention.
Figure 4:
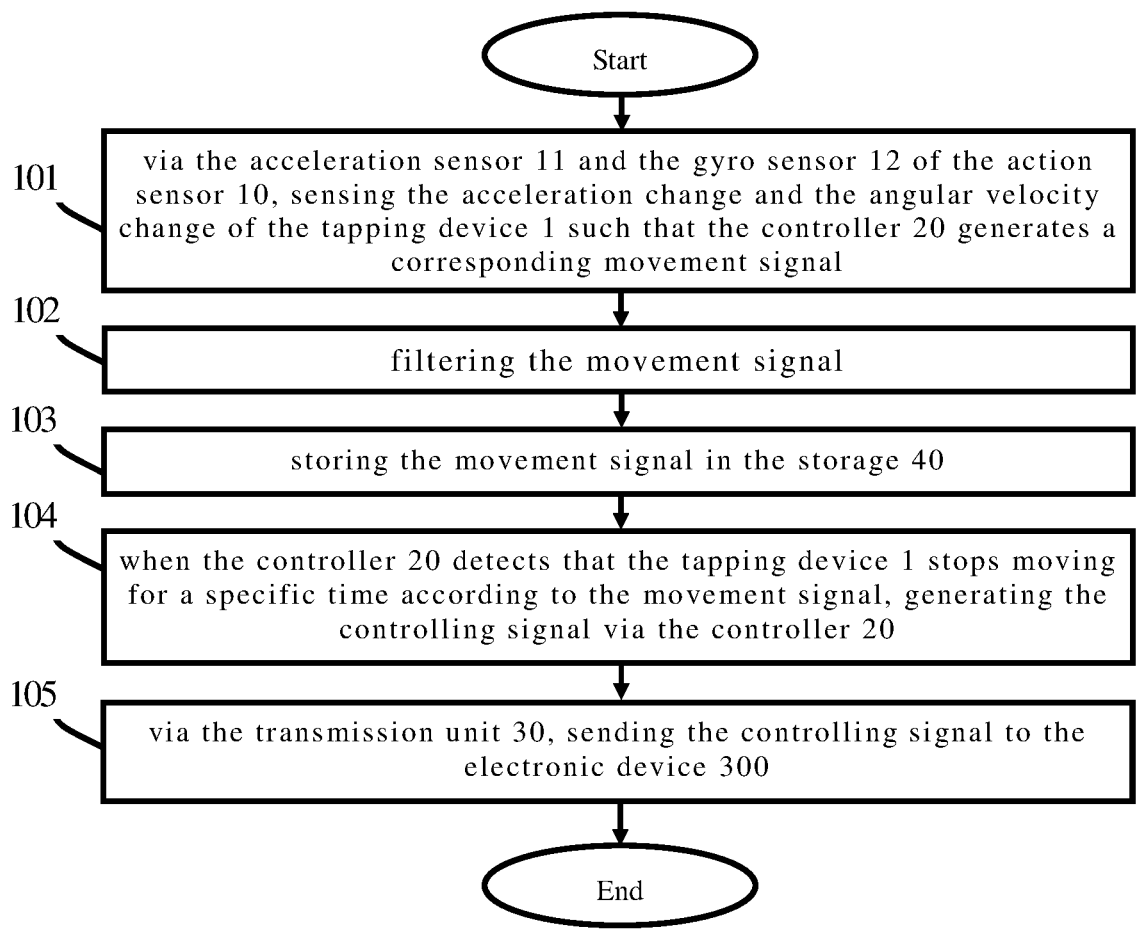
FIG. 4 illustrates a flowchart of the method of controlling an electronic device via tapping in the first embodiment of the present invention.

Please refer to FIG. 1 to FIG. 4, which illustrate the method of controlling an electronic device via tapping and the tapping controlling set in the first embodiment of the present invention. FIG. 1 illustrates a schematic drawing of the tapping controlling set and the electronic device in the first embodiment of the present invention. FIG. 2 illustrates a system structure drawing of the tapping controlling set and the electronic device in the first embodiment of the present invention. FIG. 3 illustrates a schematic drawing of the tapping controlling set tapping an external object in the first embodiment of the present invention. FIG. 4 illustrates a flowchart of the method of controlling an electronic device via tapping in the first embodiment of the present invention.

As shown in FIG. 1 to FIG. 3, in the first embodiment of the present invention, the method of controlling an electronic device via tapping is applied to a tapping controlling set 100, for allowing the user to hold the tapping controlling set 100 to tap an external object 400 to control an electronic device 300 via the tapping action of the tapping controlling set 100. The electronic device 300 can be a notebook computer, a cellphone, a digital camera, or a smart home appliance, but the type of the electronic device 300 is not limited to that description. The external object 400 can be any object that can be tapped (such as a book, a desktop or a pillow), and the external object 400 is used for being tapped by the tapping controlling set 100.

In the first embodiment of the present invention, the tapping controlling set 100 includes a tapping device 1. The tapping device 1 is a digital pen which the user can hold to tap the external object 400 and to control the electronic device 300 via the tapping action. The tapping device 1 includes an action sensor 10, a controller 20, a transmission unit 30, a storage 40, a main body 50 and a grip 60.

In the first embodiment of the present invention, the main body 50 is a stick-shaped case, and the action sensor 10, the controller 20, the transmission unit 30 and the storage 40 are both located in the main body 50. The grip 60 is located on one end of the main body 50 for allowing the user to hold the grip 60 and wave the main body 50. It should be noted that the shape of the main body 50 is not limited to the stick-shaped case and that the shape can be changed according to design requirements. In another embodiment, the storage 40 can be located in the electronic device 300, but the present invention is not limited to that design.

In the first embodiment of the present invention, the controller 20 is electrically connected to the action sensor 10, the transmission unit 30 and the storage 40. The action sensor 10 is a chip for sensing the action change of the tapping device 1 and sending the action change to the controller 20. The action sensor 10 includes an acceleration sensor 11 and a gyro sensor 12. The acceleration sensor 11 is a G-sensor. The acceleration sensor 11 is used for sensing the acceleration change on a first axis, a second axis and a third axis when the tapping device 1 moves; in the present invention, the first axis is the X axis, the second axis is the Y axis, and the third axis is the Z axis. The gyro sensor 12 provides the angular velocity change of the tapping device 1 in the three directions of the X, Y and Z axes. When the action sensor 10 senses an acceleration change and an angular velocity change, the controller 20 will calculate the movement distance in the three directions of X, Y and Z axes of the tapping device 1 according to the acceleration change, and the controller 20 will calculate the rotation angle in the three directions of the X, Y and Z axes of the tapping device 1 according to the angular velocity change. Therefore, the controller 20 can generate a movement signal according to the acceleration change and the angular velocity change.

As shown in FIG. 1, the action sensor 10 is located on one end of the main body 50; however, the action sensor 10 can also be located on the end of the grip 60 such that the user can hold the end opposite to the grip 60 to wave the grip 60. However, the amount of the action sensors 10 is not limited to one; the amount can be changed to three, such that one of the action sensors 10 is located on the end of the main body 50, another action sensor 10 is located in the middle of the main body 50, and the other action sensor 10 is located on the other end of the main body 50 and close to the grip 60. When the user holds the grip 60 to wave the main body 50, the three action sensors 10 in the three different positions will have different action changes. It is to be known that a higher number of action sensors 10 can provide more accurate sensing of the action changes when the tapping device 1 moves.

In the first embodiment of the present invention, the controller 20 is a central processing unit chip with a random access memory for generating a movement signal according to the acceleration change of the acceleration sensor 11 and the angular velocity change of the gyro sensor 12, and for generating a controlling signal according to the movement signal; the controlling signal is also used for allowing the electronic device 300 to execute the corresponding actions, such as turning specific programs on or off, adjusting the volume or causing the screen to sleep, but the actions are not limited to that description. In addition, the movement signal can also be directly sent to the electronic device 300 such that the controller of the electronic device 300 can generate a corresponding controlling signal and execute the corresponding action.

The transmission unit 30 is a wireless connection module for communicating to the electronic device 300 and for sending the controlling signal generated by the controller 20 to the electronic device 300. In another embodiment, the transmission unit 30 is a wired connection module; one end of the wired connection module is connected to a USB slot of the electronic device 300 and the other end is connected to the tapping device 1 such that the controlling signal of the controller 20 can be transferred to the electronic device 300.

In the first embodiment of the present invention, the storage 40 is a memory, and the storage 40 is electrically connected to the controller 20. The storage 40 is used for storing the relevant signal of the movement sensed by the action sensor 10 such that the controller 20 can generate the controlling signal.

In the first embodiment of the present invention, the controller 20 can also filter the noise in the movement signal to obtain an accurate movement signal to generate the controlling signal.

In the first embodiment of the present invention, as shown in FIG. 1 to FIG. 4, when the user wants to use the tapping controlling set 100 to control the electronic device 300, the user can hold the grip 60 and wave the main body 50 to cause the tapping controlling set 100 to tap the external object 400; for example, the user can wave the tapping controlling set 100 downward to tap the first face 410 (which is the top face) of the external object 400 such that the tapping device 1 of the tapping controlling set 100 generates the first movement information in the waving state; then the user can let the tapping controlling set 100 rebound naturally and upward (which means to move along the moving route A shown in FIG. 3), such that the tapping device 1 of the tapping controlling set 100 generates the second movement information of a change from the waving state to the tapping state. At this moment, the tapping controlling set 100 will cause the computer program of the method of controlling an electronic device via tapping to execute step 101: via the acceleration sensor 11 and the gyro sensor 12 of the action sensor 10, sensing the acceleration change and the angular velocity change of the tapping device 1 such that the controller 20 generates a corresponding movement signal. The movement signal includes a first movement information and a second movement information; the first movement information is generated by the tapping device changing from the static state to the waving state, and the second movement information is generated by the tapping device changing from the waving state to the tapping state.

In the process of the tapping controlling set 100 changing from the static state to the waving state, moving along the moving route A, tapping the first face 410 and slightly rebounding, the first movement information and the second movement information will be generated, wherein the first movement information is generated by the tapping device 1 changing from the static state to the waving state, and the second movement information is generated by the tapping device 1 changing from the waving state to the tapping state; the acceleration sensor 11 can sense the acceleration change of the first movement information and the second movement information of the tapping device 1 on the X axis, Y axis and Z axis; the gyro sensor 12 can sense the angular velocity change of the first movement information and the second movement information of the tapping device 1 on the X axis, Y axis and Z axis. The controller 20 can generate a movement signal according to the changes. The movement signal includes a displacement direction signal, a movement acceleration signal and an angular velocity signal of each of the first movement information and the second movement information; the displacement direction signal records the displacement direction change of the tapping device 1 which moves along the moving route A; the movement acceleration signal records the speed change of the tapping device 1 which moves along the moving route A; the angular velocity signal records the rotation angular velocity change of the tapping device 1 which moves along the moving route A. Because the tapping device 1 moves along moving route A from top to bottom, touches the first face 410 and slightly and upwardly rebounds, then after rebounding, the tapping device 1 will encounter a slight shock and return to the static state; therefore, the acceleration sensor 11 will sense a large acceleration change on the Z axis, and the waving range, vibration and time relation of the tapping device 1 can be sensed according to the change, such that the moving route, the moving speed and the turning direction of the tapping device 1 can be determined.

In another embodiment, the tapping device 1 generates the corresponding angular velocity change when moving along the moving route A, and the controller 20 can calculate the rotation angle according to the angular velocity change; thus, a different controlling signal is generated according to the tapping action of a different rotation angle.

Then the tapping controlling set 100 executes step 102: filtering the movement signal.

After the controller 20 generates a movement signal according to the acceleration change of the acceleration sensor 11 and the angular velocity change of the gyro sensor 12, the controller 20 will filter the noise in the movement signal to reduce errors.

Then the tapping controlling set 100 executes step 103: storing the movement signal in the storage 40.

After the controller 20 filters the movement signal sensed by the action sensor 10, the movement signal will be sent to the storage 40 and temporarily stored in the storage 40.

Then the tapping controlling set 100 executes step 104: when the controller 20 detects that the tapping device 1 stops moving for a specific time according to the movement signal, generating the controlling signal via the controller 20.

After the user taps the external object 400, the user will stop waving the tapping device 1, such that the controller 20 can detect that the tapping device 1 has stopped moving according to the acceleration change and the angular velocity change. In the first embodiment of the present invention, if the tapping device 1 stops moving for a specific time (the range of the specific time is between 0.5 and 2 seconds), then at that moment, the controller 20 will read the movement signal from the storage 40, wherein the movement signal is generated before receiving the signal that waving has stopped, which means that the movement signal is a complete signal generated by the tapping device 1 moving along the complete moving route A; it includes the signals that the tapping device 1 moves from the starting point, moves downward to touch the first face 410, rebounds upward from the first face 410, moves upward for a distance after rebounding and stops. Finally, the controller 20 generates the controlling signal corresponding to the complete movement signal generated by the tapping device 1 which has moved downward and upward along the moving route A. In the first embodiment, if the controller 20 reads the movement signal and determines that the movement route of the movement signal meets the moving route A (which means moving downward to touch an object, rebounding for a distance and stopping), the controller 20 will generate the controlling signal of "make the electronic device 300 open the web browser". However, the controlling signal generating mechanism for the controller 20 is not limited to the abovementioned description; in another embodiment, the controller 20 can also be designed to generate the controlling signal according to the signal of the acceleration sensor 11 and the gyro sensor 12 after the acceleration sensor 11 and the gyro sensor 12 detect the tapping action for a specific time.

Furthermore, the controller 20 can also read the movement signals of different moving routes and generate different controlling signals according to the movement signals of different moving routes. For example, if the user waves the tapping device 1 to tap on the second face 420 along the moving route B and the controller 20 determines that there is a large change on the X axis for the movement signal which meets the moving feature of the moving route B, "horizontally moving to touch an object, horizontally rebounding for a distance, then stopping", the controller 20 will generate the controlling signal of "make the screen of the electronic device 300 sleep". Or, if the user waves the tapping device 1 to tap the first face 410 along the moving route C and applies force to the tapping device 1 when rebounding such that the tapping device 1 slides along the X axis, the tapping device 1 of the tapping controlling set 100 will generate a third movement information of the change from the tapping state to the moving state, wherein the moving state means that the tapping device 1 slides along a direction relative to the external object 400 when the tapping device 1 rebounds, but the present invention is not limited to that description. Thus, the movement signal includes the first movement information, the second movement information and the third movement information; the third movement information is generated by the tapping device 1 changing from the tapping state to the moving state, and the third movement information includes a displacement direction signal, a movement acceleration signal and an angular velocity signal. The controller 20 determines that there are large changes on the Z axis and X axis for the first movement information, the second movement information and the third movement information of the movement signal, which meets the feature of the moving route C, "downwardly moving to touch an object, moving along a direction for a distance, and then stopping", and the controller 20 will generate the controlling signal of "increase the volume of the electronic device 300". Furthermore, the third movement information can also ensure that the will of the user is executed by the control to avoid the misjudgment of the signals. It is to be known that the abovementioned moving routes and the content of the controlling signals corresponding to each moving route are only examples and that they can be changed according to the actual user requirements; for example, the content of the controlling signal can also be defined according to the change of the moving speed, the rotating angle and the number of taps of the tapping device 1; thus, the user can wave the tapping device 1 with different amounts of force to generate different moving speeds or change the number of taps such that the waving range, the vibration and the time relation of the tapping device 1 can be changed to generate different controlling signals to control the electronic device 300.

Finally, the tapping controlling set 100 executes step 105: via the transmission unit 30, sending the controlling signal to the electronic device 300.

After the controller 20 generates the controlling signal of "make the electronic device 300 open the web browser", the controller 20 will send the controlling signal to the transmission unit 30; the transmission unit 30 will send the controlling signal to the electronic device 300 via the wireless connection method such that the electronic device 300 will execute the corresponding action according to the controlling signal.

Figure 5:
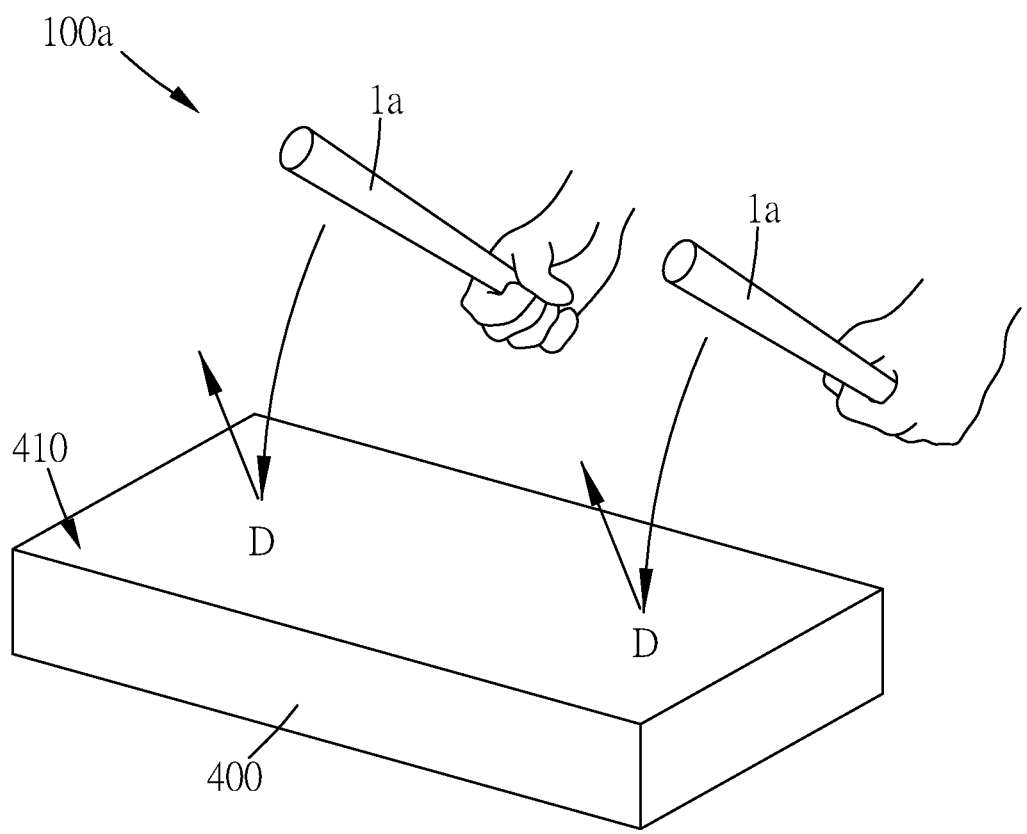
FIG. 5 illustrates a schematic drawing of the tapping controlling set tapping an external object in the second embodiment of the present invention.
Figure 6:
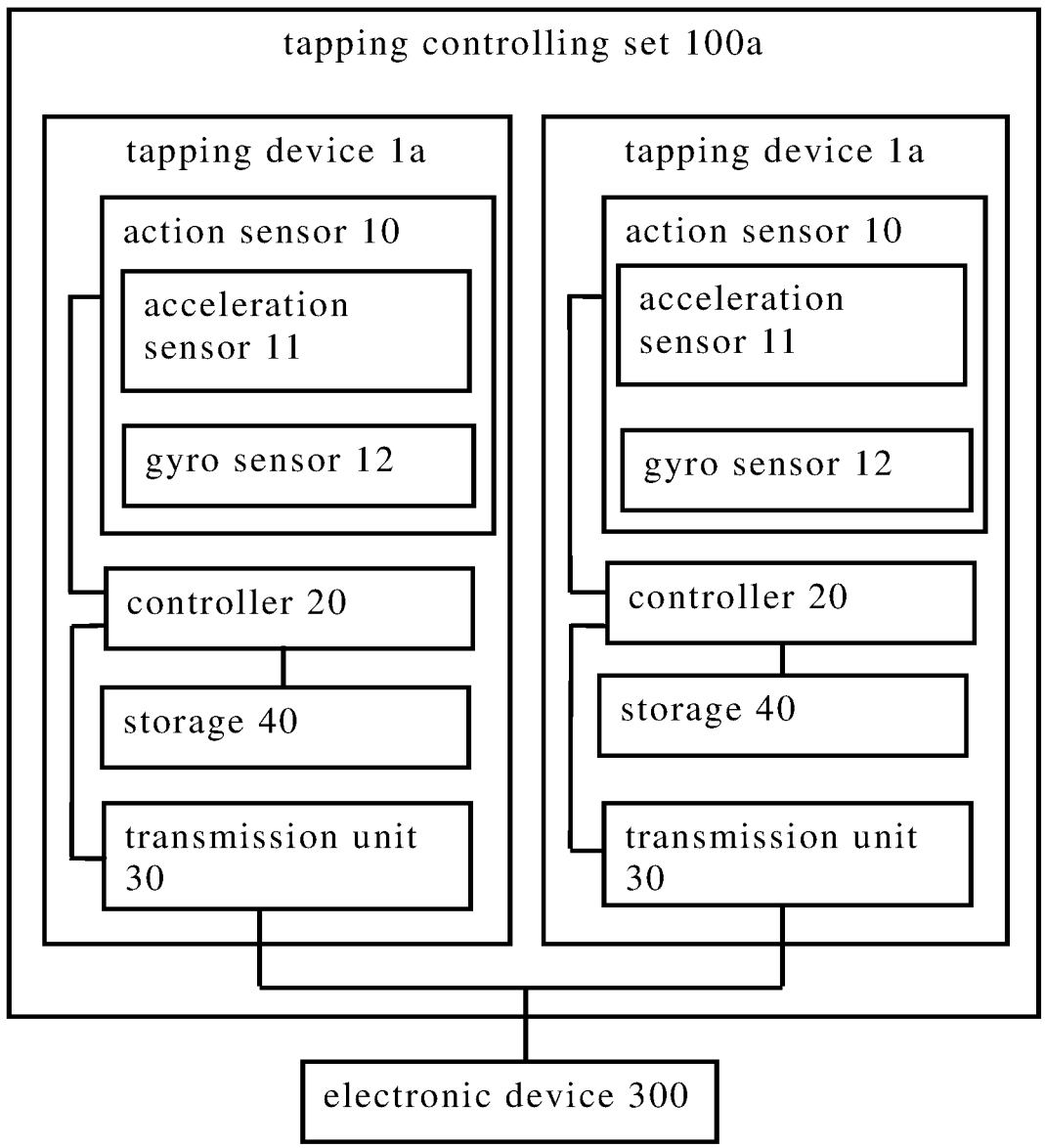
FIG. 6 illustrates a system structure drawing of the tapping controlling set and the electronic device in the second embodiment of the present invention.

Please refer to FIG. 5 and FIG. 6, which illustrate the tapping controlling set in the second embodiment of the present invention. FIG. 5 illustrates a schematic drawing of the tapping controlling set tapping an external object in the second embodiment of the present invention. FIG. 6 illustrates a system structure drawing of the tapping controlling set and the electronic device in the second embodiment of the present invention.

As shown in FIG. 5 and FIG. 6, the difference between the second embodiment and the first embodiment is that, in the tapping controlling set 100*a* of the second embodiment, the amount of the tapping devices 1*a* is two, and the transmission units 30 of the two tapping devices 1*a* are electrically connected to each other. The user can use two hands to respectively hold the two tapping devices 1*a* to respectively tap the external object 400. The two tapping devices 1*a* can move along the same moving route D to tap the external object 400 or move along different routes to tap the external object 400. Via the different moving route combinations, the tapping controlling set 100*a* of the second embodiment can generate various controlling signals to control the electronic device 300 to execute different actions.

Figure 7:
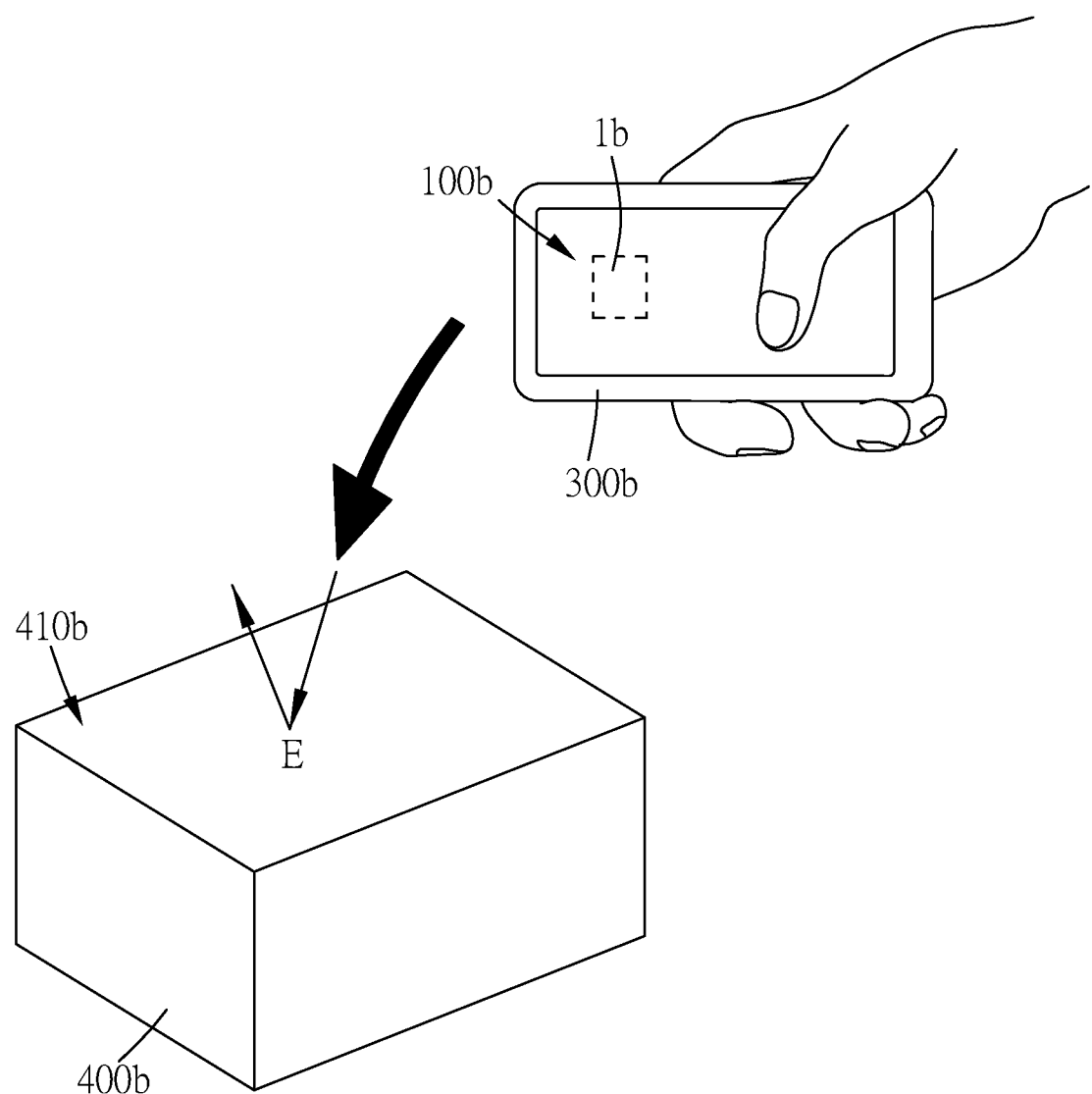
FIG. 7 illustrates a schematic drawing of the tapping controlling set tapping an external object in the third embodiment of the present invention.

Please refer to FIG. 7, which illustrates the tapping controlling set in the third embodiment of the present invention. FIG. 7 illustrates a schematic drawing of the tapping controlling set tapping an external object in the third embodiment of the present invention.

As shown in FIG. 7, the difference between the third embodiment and the first embodiment is that, in the third embodiment, the electronic device 300*b* is a cellphone. The tapping device 1*b* of the tapping controlling set 100*b* is located in the electronic device 300*b*. The user can directly hold the electronic device 300*b* to wave it along the moving route E to tap the first face 410*b* of the external object 400*b* such that the tapping device 1*b* of the tapping controlling set 100*b* also moves along the moving route E and generates the controlling signal corresponding to the moving route. The controlling signal is sent to the electronic device 300*b* for controlling the electronic device 300*b*. In another embodiment, the controller of the cellphone can replace the controller of the tapping device 1*b*; the controller of the cellphone can generate the corresponding controlling signal according to the sensor signal, and the cellphone can directly execute the corresponding action according to the controlling signal, such that there is no need for the transmission unit to send the signal.

Figure 8:
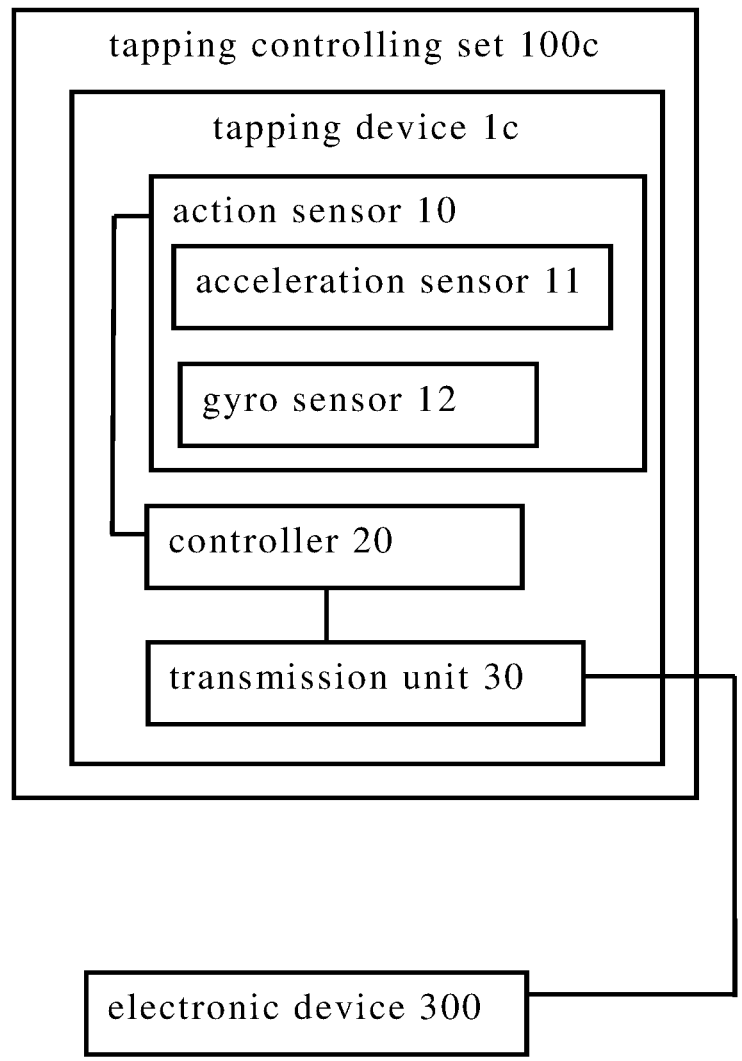
FIG. 8 illustrates a system structure drawing of the tapping controlling set and the electronic device in the fourth embodiment of the present invention.

Please refer to FIG. 8 regarding the tapping controlling set in the fourth embodiment of the present invention. FIG. 8 illustrates a system structure drawing of the tapping controlling set and the electronic device in the fourth embodiment of the present invention.

As shown in FIG. 8, the difference between the fourth embodiment and the first embodiment is that, in the fourth embodiment, the tapping device 1*c* of the tapping controlling set 100*c* does not include the storage. The movement signal generated by the action sensor 10 is stored in the random access memory of the controller 20.

Via the method of controlling an electronic device via tapping and the tapping controlling sets 100, 100*a*, 100*b* of the present invention, the user can easily hold the tapping controlling set to tap an external object to generate a controlling signal to control an electronic device according to the whole tapping action of the tapping controlling set from being static to tapping the object, leaving the object and becoming static again. The user does not need to operate the pressure sensor on the electronic device to make the electronic device execute the corresponding action. The electronic device has no need to install a pressure sensor, so the installation space in the electronic device can be reduced, allowing the volume of the electronic device to be smaller.

Please note that the above embodiments are just preferred embodiments of the present invention and are not intended to limit the scope of the present invention. It is noted that many of the above-mentioned embodiments are only for illustrative purposes; the claims of the invention should depend on the claims and not be limited to the embodiments.

What is claimed is:

1. A method of controlling an electronic device via tapping, applied to a tapping controlling set for controlling an electronic device, wherein the tapping controlling set comprises at least one tapping device, the at least one tapping device comprises an action sensor, a controller and a transmission unit, the action sensor comprises an acceleration sensor and a gyro sensor, the controller is electrically connected to the action sensor and the transmission unit, and the transmission unit is electrically connected to the electronic device, the method of controlling an electronic device via tapping comprising:

via the acceleration sensor and the gyro sensor, sensing an acceleration change and an angular velocity change of the at least one tapping device to generate a movement signal, wherein the movement signal comprises a first movement information and a second movement information, the first movement information is generated by the at least one tapping device in a waving state, and the second movement information is generated by the at least one tapping device in a tapping state;

according to the movement signal, generating a controlling signal via the controller; and via the transmission unit, sending the controlling signal to the electronic device.

2. The method of controlling an electronic device via tapping as claimed in claim 1, wherein the first movement information and the second movement information both comprise a displacement direction signal, an acceleration signal and an angular velocity signal.

3. The method of controlling an electronic device via tapping as claimed in claim 2, wherein the movement signal further comprises a third movement information, the third movement information is generated by the at least one tapping device changing from the tapping state to a moving state, and the third movement information comprises a displacement direction signal, an acceleration signal and an angular velocity signal.

4. The method of controlling an electronic device via tapping as claimed in claim 1, wherein the step of according to the movement signal, generating the controlling signal via the controller further comprises:

when the controller detects that the at least one tapping device stops moving for a specific time according to the movement signal, generating the controlling signal.

5. The method of controlling an electronic device via tapping as claimed in claim 1, wherein the at least one tapping device further comprises a storage, and the storage is electrically connected to the controller.

6. The method of controlling an electronic device via tapping as claimed in claim 5, further comprising: storing the movement signal in the storage.

7. The method of controlling an electronic device via tapping as claimed in claim 1, further comprising: filtering the movement signal.

8. A tapping controlling set, for controlling an electronic device via tapping, the tapping controlling set comprising:

at least one tapping device, comprising:

an action sensor, comprising a gyro sensor and an acceleration sensor, wherein the gyro sensor is used for sensing an angular velocity change of the at least one tapping device, and the acceleration sensor is used for sensing an acceleration change of the at least one tapping device;

a controller, electrically connected to the action sensor, wherein the controller is used for generating a movement signal according to the acceleration change and the angular velocity change, the movement signal comprises a first movement information and a second movement information, the first movement information is generated by the at least one tapping device being in a waving state, the second movement information is generated by the at least one tapping device being in a tapping state, and the controller is used for generating a controlling signal according to the movement signal; and a transmission unit, electrically connected to the controller and the electronic device, wherein the transmission unit is used for sending the controlling signal to the electronic device.

9. The tapping controlling set as claimed in claim 8, wherein the first movement information and the second movement information each comprise a displacement direction signal, an acceleration signal and an angular velocity signal.

10. The tapping controlling set as claimed in claim 9, wherein the movement signal further comprises a third movement information, the third movement information is generated by the at least one tapping device changing from the tapping state to a moving state, and the third movement information comprises a displacement direction signal, an acceleration signal and an angular velocity signal.

11. The tapping controlling set as claimed in claim 8, wherein the controller is further used for detecting if the at least one tapping device stops moving for a specific time according to the movement signal to generate the controlling signal.

12. The tapping controlling set as claimed in claim 8, wherein the at least one tapping device further comprises a storage, and the storage is electrically connected to the controller.

13. The tapping controlling set as claimed in claim 12, wherein the storage is used for storing the movement signal.

14. The tapping controlling set as claimed in claim 8, wherein the controller is used for filtering the movement signal.

15. The tapping controlling set as claimed in claim 8, wherein the at least one tapping device further comprises a main body, and the action sensor is located on one end of the main body.

16. The tapping controlling set as claimed in claim 8, wherein an amount of the at least one tapping devices is two, and each of the tapping devices and the transmission unit are electrically connected to each other.

17. The tapping controlling set as claimed in claim 8, wherein the at least one tapping device is located in the electronic device.

* * * * *